US012752926B2

(12) United States Patent
Daandels et al.

(10) Patent No.: US 12,752,926 B2
(45) Date of Patent: Oct. 6, 2026

(54) FAIRING WITH AIR INLET DEVICE AND STIFFENER ELEMENT FOR AN AIRCRAFT, METHOD OF MAKING SAME, AND AIRCRAFT

(71) Applicant: Airbus Operations GmbH, Hamburg (DE)

(72) Inventors: Dort Daandels, Hamburg (DE); Wolfgang Ehrhard, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 19/098,441

(22) Filed: Apr. 2, 2025

(65) Prior Publication Data

US 2025/0313341 A1 Oct. 9, 2025

(30) Foreign Application Priority Data

Apr. 5, 2024 (EP) .................................... 24168787

(51) Int. Cl.
*B64D 29/00* (2006.01)
*B64F 5/10* (2017.01)

(52) U.S. Cl.
CPC ................ *B64D 29/00* (2013.01); *B64F 5/10* (2017.01)

(58) Field of Classification Search
CPC .... B64C 7/00; B64C 7/02; B64C 1/38; B64C 1/0009; B64C 21/00; B64C 21/06; B64C 2230/06; B64C 2230/08; B64D 29/00; B64D 29/02; B64D 29/04; B64D 29/06
See application file for complete search history.

(56) References Cited

U.S. PATENT DOCUMENTS 5,114,100 A 5/1992 Rudolph et al.
5,826,794 A 10/1998 Rudolph et al.
11,312,499 B2 * 4/2022 Maple .................... B64D 33/02
12,024,287 B2 * 7/2024 Tsai .......................... B64C 7/00
12,043,397 B2 * 7/2024 Daandels .................. B64C 7/00
12,515,784 B1 * 1/2026 Shepherd .................. B64C 7/00
2014/0286764 A1 9/2014 Laurant et al.
2020/0102082 A1 4/2020 Sanz et al.

FOREIGN PATENT DOCUMENTS

EP 2776319 B1 4/2016

OTHER PUBLICATIONS

European Search Report for corresponding European Patent Application No. 24168787.0 dated Aug. 12, 2024.

* cited by examiner

*Primary Examiner* — Arfan Y. Sinaki
(74) *Attorney, Agent, or Firm* — Greer, Burns & Crain, Ltd.

(57) ABSTRACT

A fairing for an aircraft, comprises a wall element comprising an inner surface and an outer surface, wherein the outer surface is exposed to a free air flow outside the fairing, and at least one stiffener element attached to the inner surface of the wall element, to keep the fairing in shape under dynamic pressure loads. The fairing comprises at least one air inlet device comprising an inlet opening for a part of the free air flow outside the fairing to pass through the wall element and to enter the interior of the fairing. The air inlet device is at least partially integrated into the stiffener element, and the inlet opening of the air inlet device is formed in the stiffener element and extends into or through the stiffener element. The air inlet device and the stiffener element may be integrally formed as a single part, by 3D printing.

12 Claims, 4 Drawing Sheets

FAIRING WITH AIR INLET DEVICE AND STIFFENER ELEMENT FOR AN AIRCRAFT, METHOD OF MAKING SAME, AND AIRCRAFT

CROSS-REFERENCES TO RELATED APPLICATIONS

This application claims the benefit of European Patent Application Number 24168787.0 filed on Apr. 5, 2024, the entire disclosure of which is incorporated herein by way of reference.

FIELD OF THE INVENTION

The invention relates to a fairing comprising an air inlet device. Further, the invention relates to a method of making same, and to an aircraft. In particular, the fairing is for use in an aircraft.

BACKGROUND OF THE INVENTION

Aircrafts usually comprise fairings for protecting components located in the interior of the fairing. Well-known examples are fairings which are attached to the wings of aircrafts. Such fairings are typical around track beams for flaps, i.e., they usually comprise in their interior track beams for flaps. But other types of parts and equipment may be located as well within such fairing elements, like e.g., actuators, motors, sensor, electric equipment.

Fairings quite often comprise an air inlet to allow an air flow to pass from the exterior of the fairing to its interior, which is usually needed for cooling purposes, i.e., to cool the components located within the interior of the fairing. Such air inlets are usually formed as so called NACA ducts which have a specific and well-known design to allow the free airflow outside of an aircraft to enter into the interior of the fairing with minimal disturbance to the air flow. Generally, NACA ducts are applied on surfaces to get air inside a structure without disturbing the outside airflow too much.

The invention is in particular related to fairings for aircrafts, comprising one or more air inlets between an external surface of the fairing, which is the surface in the free air flow on the outside of the aircraft, and an internal surface of the fairing, which is the surface not subject to the outside free air flow.

The airflow entering through an air inlet into the interior of a fairing has to arrive at specific positions in order to cool the equipment or parts within the fairing. For an efficient cooling, the airflow shall not be too far aft and not be too far forward in the fairing. Quite often, system parts are in the way which do not allow to select a position for the air inlet which is needed.

In addition, the position of stiffeners like e.g., stringers within the fairing have to be considered, which may be directly behind the air inlet of an air inlet device or NACA duct. These stiffeners are stringers block the incoming air flow.

Moving the air inlet or NACA duct too far aft will reduce its efficiency. Moving the air inlet too far forward is quite often not possible because of e.g., the fairing split is in that region. Locally removing the stiffener would significantly reduce the structural capability against deformation of the fairing design.

Thus, the positions where air inlet devices or NACA ducts can be located in a fairing wall are very limited, mainly due to the parts within the fairing and the structural elements of the fairing itself. Thus, in many cases, heat cannot be optimally transported away from the parts or components which need to be cooled by the airstream.

SUMMARY OF THE INVENTION

It is an object of the invention to improve the airstream within the fairing for a better cooling of components located therein, without significantly reducing the structural capability of the fairing against deformation.

According to a first aspect, the invention provides a fairing for an aircraft, comprising a wall element which comprises an inner surface and an outer surface, wherein the outer surface is exposed to a free air flow outside the fairing; at least one stiffener element attached to the inner surface of the wall element, to keep the fairing in shape under dynamic pressure loads; and at least one air inlet device comprising an inlet opening to allow a part of the free air flow outside the fairing to pass through the wall element and to enter the interior of the fairing; wherein the air inlet device is at least partially integrated into the stiffener element and extends into or through the stiffener element (18).

Preferably, the stiffener element and the air inlet device are integrally formed as one single component.

Preferably, the stiffener element, the air inlet device and the wall element are integrally formed as one single component.

Preferably, the air inlet device is formed as a NACA duct.

Preferably, the stiffener element is formed as a stringer.

In particular, the air inlet or NACA duct is directly integrated into the stiffener element or stringer.

Preferably, the fairing is configured to be positioned around a track beam for a flap.

Preferably, the inlet opening of the air inlet device is formed in the stiffener element.

Preferably, the inlet opening of the air inlet device is exactly positioned in a surface of the stiffener element.

In particular, the exit of the air inlet device or NACA duct is directly in a wall of the stiffener element.

Preferably, the mouth of the inlet opening lies flat on the surface of the stiffener element.

Preferably, the aft end of the air inlet device is located within the stiffener element.

In some cases, it is preferred that the front end and the aft end of the air inlet device are located on opposite sides of the stiffener element.

That means, the stiffener element may be positioned between the front end and the aft end of the air inlet device.

In particular, the front end of the air inlet device may be located within the stiffener element.

Preferably, the position of the air inlet device in the stiffener element is selected depending on the required locations of components in the interior of the fairing which shall be cooled by the airflow.

Preferably, the air inlet device extends in its longitudinal direction perpendicular into or through the stiffener element.

According to a second aspect, the invention provides a method of making a fairing, comprising the steps: providing a wall element comprising an inner surface and an outer surface; providing at least one stiffener element to keep the fairing in shape under dynamic pressure loads; and providing at least one air inlet device comprising an inlet opening to allow a part of a free air flow outside the fairing to pass through the wall element and to enter the interior of the fairing; wherein the air inlet device is at least partially integrated into the stiffener element, so that it extends into or through the stiffener element.

Preferably, the inlet opening of the air inlet device is formed in the stiffener element.

Preferably, the air inlet device and the stiffener element are manufactured as one single, integrally formed component.

Preferably, the wall element is formed as well as a part of the single, integrally formed component comprising the air inlet device and the stiffener element.

Preferably, the air inlet device and/or the stiffener element and/or the wall element are provided in common.

Preferably, the integrally formed component is manufactured by 3-D-printing.

Due to the selection of 3D printing technology for manufacturing, the effort in manufacturing the fairing according to the invention is not increased.

In the final fairing, the outer surface of the wall element is exposed to a free air flow outside the fairing.

Preferably, in the final fairing, the stiffener element, in which at least a portion of the air inlet device is integrated, is formed on the inner surface of the wall element.

According to a third aspect, the invention provides an aircraft comprising a fairing according to the first aspect of the invention, or a fairing which is made by the method according to the second aspect of the invention.

In particular, the NACA duct creates a hole, similar like mouse holes well known in aircraft structures instead of fully cutting the stringer, and therefore the strength of the stringer is not essentially influenced by the integrated NACA duct.

The fairing is preferably manufactured as a 3D printer structure, and therefore the effort to combine these elements is low.

The air inlet device can be located at positions where they are needed. Therefore, the freedom of design is enhanced.

BRIEF DESCRIPTION OF THE DRAWINGS

In the following, an exemplary embodiment of the invention showing further advantages and characteristics is described in detail with reference to the figures, in which.

DETAILED DESCRIPTION OF THE PREFERRED EMBODIMENTS

Figure 1:
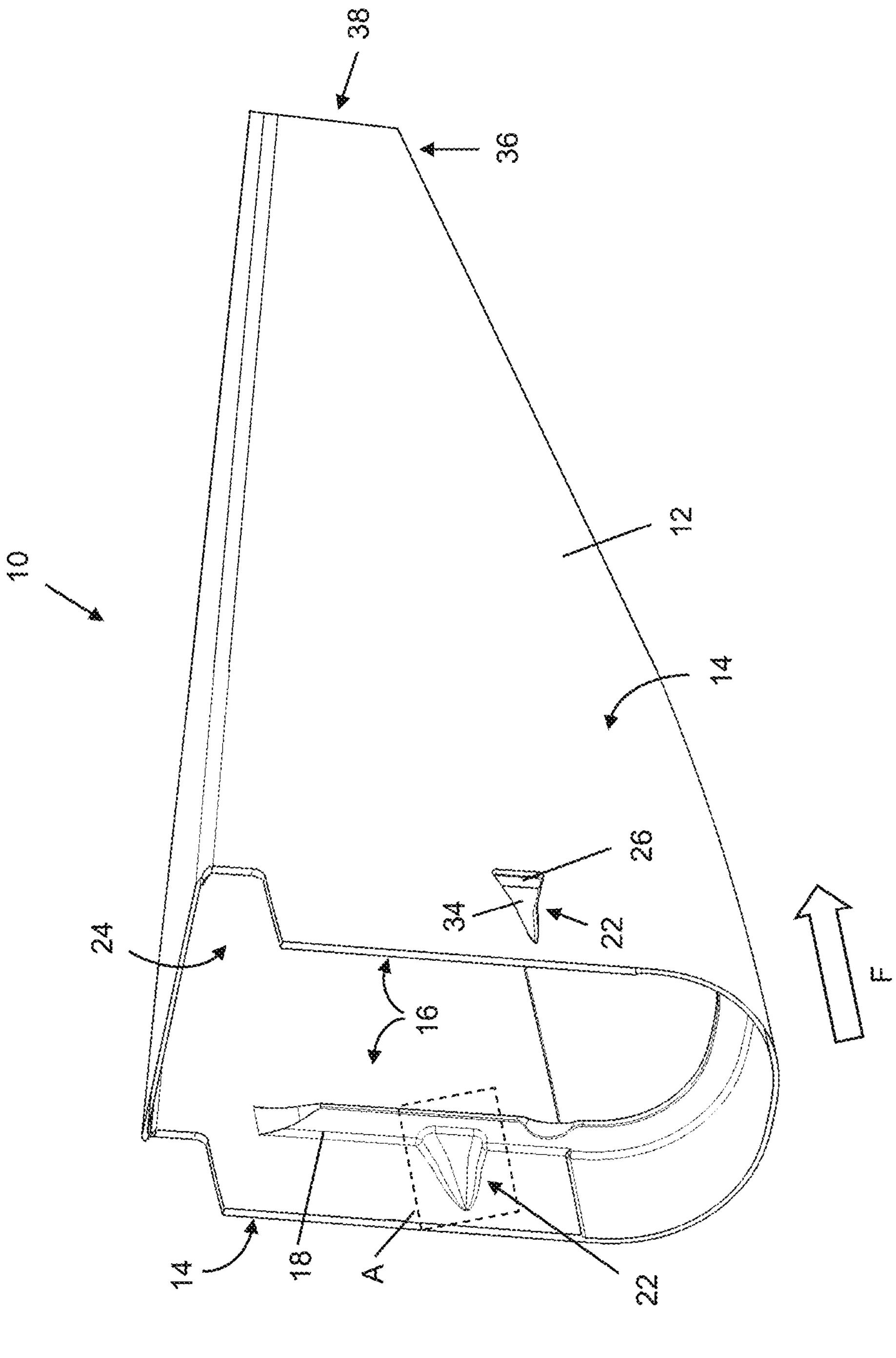
FIG. 1 shows a perspective view of a fairing according to a preferred embodiment of the invention, as a view diagonally on the front and on the left side of the fairing.

FIG. 1 shows a fairing 10 for an aircraft according to a preferred embodiment of the invention. In this example, the fairing 10 is configured to be positioned around track beam for a flap of an aircraft.

The fairing 10 comprises one or more wall elements 12 having an external surface 14 which is exposed to a free air flow F outside of the fairing 10, that means outside of the aircraft during flight. The wall element 12 further comprises an internal surface 16 which is on the inner side of wall element 12, i.e., facing the interior of the fairing 10.

A stiffener element 18 which is formed as a stringer is attached to or formed on the internal surface 16 of the wall element 12 in order to keep the wall element 12 and thus the fairing 10 in shape under dynamic pressure loads which act on the wall due to the air flow F.

In this example, the wall element or elements 12 are configured as sidewalls on each side of fairing 10.

An air inlet device 22 is formed in wall element 12 on both sides of the fairing 10 to allow a part of free air flow F to enter into the interior 24 of fairing 10, for cooling system components arranged within the fairing 10.

The air inlet device 22 comprises a channel formed as a depression 34 in wall element 12 on its external or outer surface 14, which leads to an inlet opening 26 in the direction of the free airflow F.

The fairing 10 further comprises an outlet opening 38 located at the aft end 36 of fairing 10.

Figure 2:
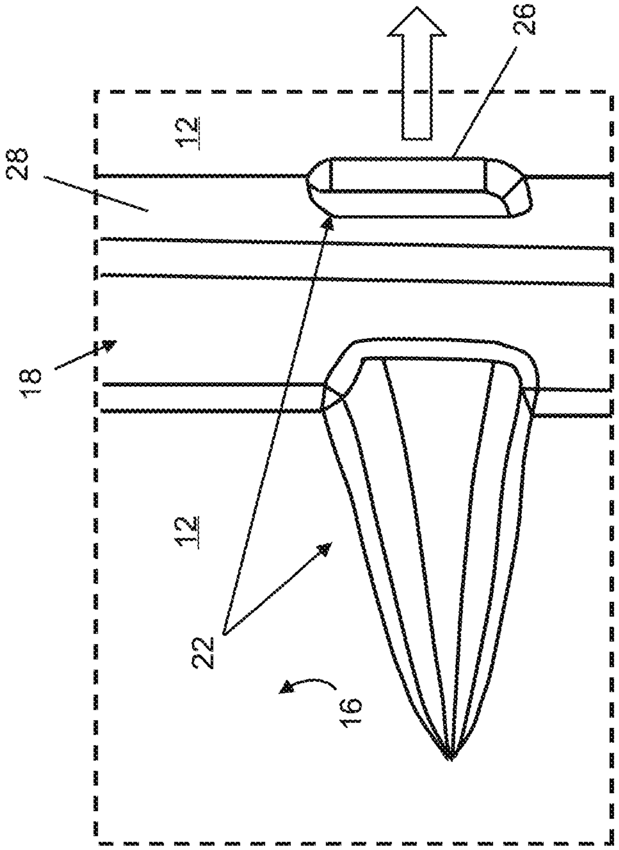
FIG. 2 shows an enlarged top view of an air inlet device of the fairing shown in FIG. 1, seen from the inside of the fairing.

As depicted in FIG. 2, which shows an enlarged section A of FIG. 1, the air inlet opening 26 of air inlet device 22 allows the free air flow F to pass from the exterior of fairing 10 through wall element 12 and through the stiffener element 18 formed as a stringer into the interior 24 of fairing 10.

The air inlet device 22 which is formed as a NACA duct is integrated into the stiffener element 18 which is formed as a stringer.

The inlet opening 26 of air inlet device 22 is formed in a wall 28 of the stiffener element. The air inlet opening 26 is formed between the external surface 14 and the internal surface 16 of wall element 12 of the fairing 10.

Figure 3:
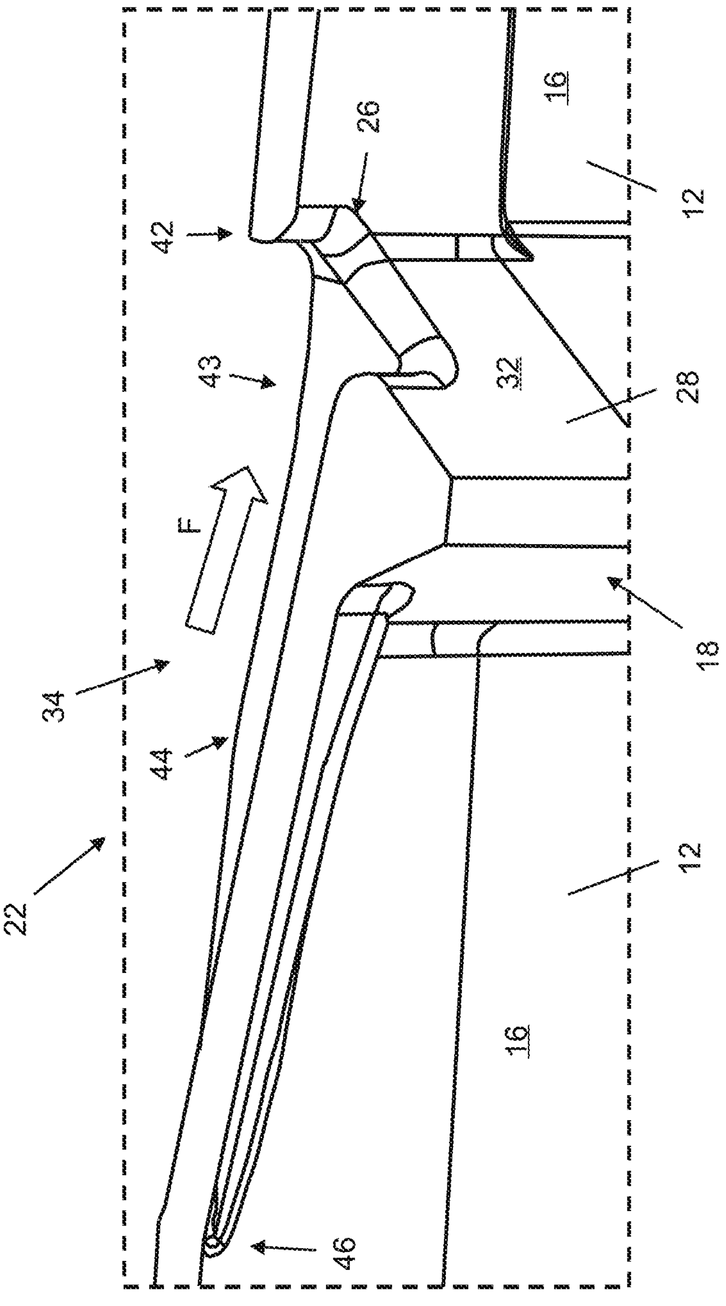
FIG. 3 shows a perspective sectional view of the air inlet device of the fairing shown in FIG. 1, seen from the inside of the fairing.
Figure 4:
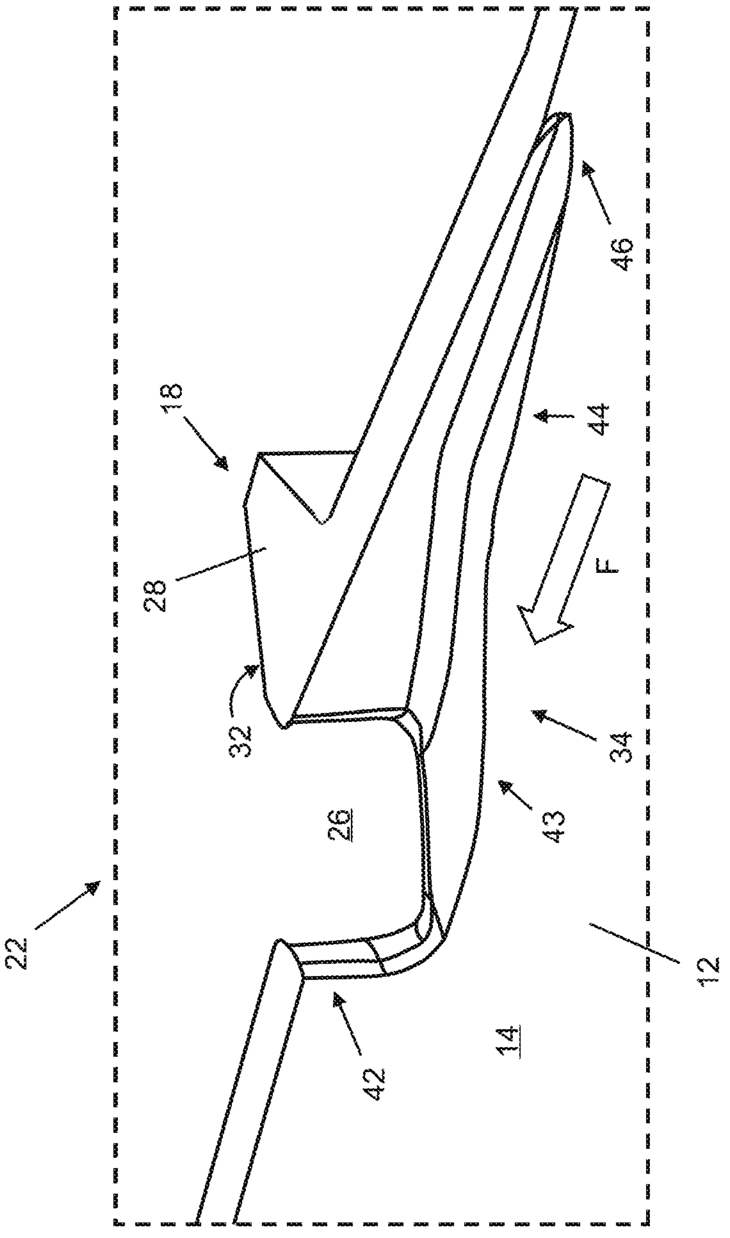
FIG. 4 shows a perspective sectional view of the air inlet of the fairing shown in FIG. 1, seen from the outside of the fairing.

FIG. 3 and FIG. 4 show more details of the air inlet device 22 which is integrally formed in stiffener element 18. FIG. 3 shows a perspective cross sectional view of the air inlet device 22 seen from the interior of the fairing 10, whereas FIG. 4 shows a perspective cross sectional view of the air inlet device 22 seen from the outside of the fairing 10.

As can be seen from FIG. 3, the stringer 18 is formed on the internal or inner surface 16 of wall element 12 of the fairing 10. The stiffener element 18 and the air inlet device 22 are integrally formed as one single part.

The inlet opening 26 of air inlet device 22 is directly integrated in the wall 28 of or formed by stringer 18. The exit or mouth of the air inlet device 22, or NACA duct, which is formed by inlet opening 26, is exactly in the plane of the surface of wall 28 of stringer 18. That means that the inlet opening 26 of air inlet device 22 is exactly positioned in a surface 32 of stringer 18, which surface is positioned in the interior of the fairing 10.

Preferably, the stringer 18 together with the integrated NACA duct is manufactured by using 3D printing technology. As a result, the effort in manufacturing the integrated NACA-duct-stringer part is not increased.

In particular, the stiffener element 18, the air inlet device 22 and the wall element 12 are all together quickly formed as one single part.

As can be from FIG. 3 and FIG. 4, the depression 34 of air inlet device 22 in the external surface 14 of the wall element 12 forms a channel which leads to inlet opening 26, so that the air flow F is allowed to pass through the stringer element 18.

The depression 34 becomes continuously narrower towards the front end 46 of air inlet device 22 and wider towards the rear end 42 of air inlet device 22, where the inlet opening 26 is formed in stringer 18. In this way, the depression 34 leads into the inlet opening 26 which is located at the rear side or surface 32 of the stringer 18, which side is facing the aft end 36 of fairing 10.

More precisely, a rear section 43 of the air inlet device 22 or NACA duct is integrated in stringer 18. That rear section 43 comprises the inlet opening 26 and a rear portion of the depression 34 which is formed in the wall element 12 at its external surface 14. A front section 44 of the air inlet device 22 is located in front of the stringer 18 and comprises a front portion of the depression 34 formed in wall element 12 at its external surface 14.

The NACA duct or air inlet device 22 creates a hole in stringer 18, similar like mouse holes known in aircraft structures. Thus, it is not necessary to fully cut the stringer.

During flight, the free air flow F, or more exactly a part thereof, enters via the depression 34 and the inlet opening 26 of the air inlet device 22 into the interior of fairing 10. After passing therethrough, the airflow exits from fairing 10 through an exit opening 38 formed at the aft end 36 of fairing 10 (see FIG. 1).

In the preferred embodiment shown here, the stiffener element 18 is positioned at the aft end 42 of air inlet device 22. This allows an optimized air flow into the fairing since the inlet opening 26 or mousehole is relatively wide.

In other embodiments, the air inlet device 22 is moved further aft in relation to stiffener element 18, but it is still partly underneath the stiffener element 18. The exit of the air inlet device 22, which is formed by inlet opening 26, is then a bit more to the back. This reduces the size of the mouse hole formed in the stiffener element 18 by inlet opening 26. That configuration is advantageous for the stiffener element 18.

In general, the stiffener element 18 can be located between the front end 46 and the aft or rear end 42 of the air inlet device 22. The position of the air inlet device 22 relative to the stiffener element 18 is selected depending on the required location of the stiffener element 18, as well as on required locations of parts or system parts of the aircraft in the interior of the fairing 10, which shall be cooled by the airflow entering into the fairing 10.

As can be seen in FIG. 3, the rear surface 32 of stiffener element 18, which comprises the inlet opening 26, is inclined forwards at an angle from the internal surface 16 of wall element 12. In this way, the inlet opening 26 which forms a mouth through which the air flow F enters the interior of fairing 10, is also inclined at an angle with respect to the internal surface 16 of fairing 10.

The inlet opening 26 is relatively small to reduce the drag impact.

Nevertheless, enough air enters the interior of fairing 10. Depending on the overall dimensions and the requirements of fairing 10, the inlet opening 26 may have a height of e.g., about one to three cm. But other dimensions are possible as well.

According to an option, the fairing is made from separate elements, i.e., it is not 3D printed. In this case, the mouse hole needs to be added to the stiffener, similar to mouse holes in ribs to allow stringers to pass. The air inlet device 22 or NACA duct can run through this mouse hole.

If it should be needed for stability, a flange can be added on the mouse hole section and a fastener connection can be added to the wall of the NACA duct.

A countersink fastener can be applied, if a protruding head fastener would block too much of the airflow in the NACA duct.

The invention provides a better position of the air inlet device, so that it is more efficient and does not interfere with any components. In addition, the stiffness of the stiffener element is largely retained.

The combination of air inlet device or NACA duct with stiffener element 18 results in particular in the following advantages:

No cut of the stiffener or stringer is needed. There is no need for increased skin thickness, which leads to a reduction of weight.

There is no need to increase the size of the NACA duct because of a less favorable location. Due to the invention, the NACA duct remains small, and therefore, the aerodynamic drag impact is reduced.

The NACA duct hole or inlet opening remains small and thus avoids an essential weakening of the structure. This results in less need for skin reinforcement, and thus in reduction of weight.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS

10 fairing
12 wall element
14 external surface/outer surface
16 internal surface/inner surface
18 stiffener element/stringer
22 air inlet device/NACA duct
24 interior of fairing
26 inlet opening
28 wall of stringer
32 rear surface of stiffener element
34 depression
36 aft end of fairing
38 exit opening
42 rear end of air inlet device
43 rear section of air inlet device
44 front section of air inlet device
46 front end of air inlet device
F free air flow

The invention claimed is:

1. A fairing for an aircraft, comprising:

a wall element comprising an inner surface and an outer surface, wherein the outer surface is exposed to a free air flow outside the fairing, at least one stiffener element attached to the inner surface of the wall element, to keep the fairing in shape under dynamic pressure loads, and at least one air inlet device comprising an inlet opening to allow a part of the free air flow outside the fairing to pass through the wall element and to enter the interior of the fairing, wherein the air inlet device is at least partially integrated into the stiffener element and extends into or through the stiffener element.

2. The fairing according to claim 1, wherein a) the stiffener element and the air inlet device are integrally formed as one single component, or b) the stiffener element, the air inlet device and the wall element are integrally formed as one single component.

3. The fairing according to claim 1, wherein the air inlet device is formed as a NACA duct, or the stiffener element is formed as a stringer, or both.

4. The fairing according to claim 1, wherein the inlet opening of the air inlet device is formed in the stiffener element, or wherein the inlet opening of the air inlet device is exactly positioned in a surface of the stiffener element, or is positioned in a plane of a surface of the stiffener element, or both, or a combination thereof.

5. The fairing according to claim 1, wherein the air inlet device comprises a front end and an aft end, and wherein the aft end is located within the stiffener element, or the front end and the aft end are located on opposite sides of the stiffener element, or the front end is located within the stiffener element.

6. The fairing according to claim 1, wherein the air inlet device extends in a longitudinal direction perpendicular into or through the stiffener element.

7. An aircraft comprising:

the fairing according to claim 1.

8. The fairing according to claim 1, wherein the stiffener element is a stringer.

9. A method of making a fairing, comprising:

providing a wall element comprising an inner surface and an outer surface;

providing at least one stiffener element to keep the fairing in shape under dynamic pressure loads; and providing at least one air inlet device comprising an inlet opening to allow a part of a free air flow outside the fairing to pass through the wall element and to enter the interior of the fairing, wherein the air inlet device is at least partially integrated into the stiffener element, so that the air inlet device extends into or through the stiffener element.

10. The method according to claim 9, wherein the inlet opening of the air inlet device is formed in the stiffener element.

11. The method according to claim 9, wherein the air inlet device, or the stiffener element, or the wall element, or any combination thereof are manufactured as one single, integrally formed component.

12. The method according to claim 9, wherein the stiffener element is a stringer.

* * * * *